United States Patent
Henning et al.

(10) Patent No.: US 10,782,883 B1
(45) Date of Patent: Sep. 22, 2020

(54) CLOUD-BASED AD-HOC IMPACT ANALYSIS OF DATA SAVING POTENTIALS

(71) Applicant: SAP SE, Walldorf (DE)

(72) Inventors: Steffen Henning, Malsch (DE); Mateusz Skrzyniarz, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/511,489

(22) Filed: Jul. 15, 2019

(51) Int. Cl.
*G06F 3/00* (2006.01)
*G06F 3/06* (2006.01)

(52) U.S. Cl.
CPC ............ *G06F 3/0608* (2013.01); *G06F 3/067* (2013.01); *G06F 3/0625* (2013.01); *G06F 3/0629* (2013.01); *G06F 3/0643* (2013.01); *G06F 3/0652* (2013.01)

(58) Field of Classification Search
CPC .............................. G06F 3/0608; G06F 3/0652
USPC .......................................................... 711/154
See application file for complete search history.

(56) References Cited

U.S. PATENT DOCUMENTS

| 5,634,009 A * | 5/1997 | Iddon .................... H04L 29/06 707/999.01 |
| 6,418,523 B2 * | 7/2002 | Porterfield .......... G06F 12/1081 345/568 |
| 8,983,913 B2 | 3/2015 | Held |
| 9,081,806 B2 | 7/2015 | Hegde et al. |
| 9,536,199 B1 * | 1/2017 | Procopio .................. G06F 9/46 |
| 9,613,322 B2 | 4/2017 | Clark et al. |
| 9,779,130 B2 | 10/2017 | Rosenburg et al. |
| 10,169,162 B2 | 1/2019 | Hammer |

FOREIGN PATENT DOCUMENTS

WO 2016131014 A1 8/2016

* cited by examiner

*Primary Examiner* — Jae U Yu
(74) *Attorney, Agent, or Firm* — Sterne, Kessler, Goldstein & Fox P.L.L.C.

(57) ABSTRACT

Disclosed herein are system, method, and computer program product embodiments for the assessing of data reduction potential of a source repository of a source module, by a central module, the generation of data savings potential statistics of the source repository by the central module, and the subsequent generation of visual representation of the statistics, and displaying of the visual representation of data reduction potential information.

18 Claims, 10 Drawing Sheets

800

| 801a Reduction Method | 801b Reduction Object | 801c Table Name | 801d Year | 801e Month | 801f Residence Time | 801g Number of Records | 801h Reduction size MEM [in kb] | 801i Reduction size DISK [in kb] | 801j Sum of Records | 801k Sum of Redu. in MEM [in kb] | 801l Sum of Redu. on Disk [in kb] |
|---|---|---|---|---|---|---|---|---|---|---|---|
| DAAG | FI_DOCUMENT | Table_one | 2019 | 04 | 00 | 100 | 200 | 220 | 1000 | 2000 | 2200 |
| DAAG | FI_DOCUMENT | Table_one | 2019 | 03 | 01 | 90 | 180 | 198 | 910 | 1820 | 1980 |
| DAAG | FI_DOCUMENT | Table_one | 2019 | 02 | 02 | 110 | 220 | 242 | 810 | 1620 | 1782 |
| DAAG | FI_DOCUMENT | Table_one | 2019 | 01 | 03 | 100 | 200 | 220 | 700 | 1400 | 1540 |
| DAAG | FI_DOCUMENT | Table_one | 2018 | 12 | 04 | 95 | 190 | 209 | 600 | 1200 | 1320 |
| DAAG | FI_DOCUMENT | Table_one | 2018 | 11 | 05 | 105 | 210 | 231 | 505 | 1010 | 1111 |
| DAAG | FI_DOCUMENT | Table_one | 2018 | 10 | 06 | 85 | 170 | 187 | 400 | 800 | 880 |
| DAAG | FI_DOCUMENT | Table_one | 2018 | 09 | 07 | 100 | 200 | 220 | 315 | 630 | 693 |
| DAAG | FI_DOCUMENT | Table_one | 2018 | 08 | 08 | 115 | 230 | 253 | 215 | 430 | 473 |
| DAAG | FI_DOCUMENT | Table_one | 2018 | 07 | 09 | 100 | 200 | 220 | 100 | 200 | 220 |
| DAAG | FI_DOCUMENT | Table_two | 2019 | 04 | 00 | 500 | 500 | 550 | 2000 | 2000 | 2200 |
| DAAG | FI_DOCUMENT | Table_two | 2019 | 03 | 01 | 0 | 0 | 0 | 1500 | 1500 | 1650 |
| DAAG | FI_DOCUMENT | Table_two | 2019 | 02 | 02 | 0 | 0 | 0 | 1500 | 1500 | 1650 |
| DAAG | FI_DOCUMENT | Table_two | 2019 | 01 | 03 | 500 | 500 | 550 | 1500 | 1500 | 1650 |
| DAAG | FI_DOCUMENT | Table_two | 2018 | 12 | 04 | 0 | 0 | 0 | 1000 | 1000 | 1100 |
| DAAG | FI_DOCUMENT | Table_two | 2018 | 11 | 05 | 0 | 0 | 0 | 1000 | 1000 | 1100 |
| DAAG | FI_DOCUMENT | Table_two | 2018 | 10 | 06 | 500 | 500 | 550 | 1000 | 1000 | 1100 |
| DAAG | FI_DOCUMENT | Table_two | 2018 | 09 | 07 | 0 | 0 | 0 | 500 | 500 | 550 |
| DAAG | FI_DOCUMENT | Table_two | 2018 | 08 | 08 | 0 | 0 | 0 | 500 | 500 | 550 |
| DAAG | FI_DOCUMENT | Table_two | 2018 | 07 | 09 | 500 | 500 | 550 | 500 | 500 | 550 |

FIG. 8

“CLOUD-BASED AD-HOC IMPACT ANALYSIS OF DATA SAVING POTENTIALS”

BACKGROUND

In the present day and age, an ever increasing amount of organizations have to store immense amounts of data in the form of databases to access for use during daily business operations. With the advent of the internet, cloud computing, and other such technological advances, content tends to be fragmented across applications and systems, and the amount of data accessed from such databases has increased over time in an exponential manner. As a result, in many of these organizations there is an existing tension between the needs of the Information Technology (IT) team for operating a slim solution from the perspective of infrastructure, latency, performance, and cost of maintenance, and the needs of the business owners, from the perspective of continued access to vital data for the benefit of the business. Such needs can change as well over time, and this balance between maintenance and access to data often needs to be re-evaluated.

It thus becomes difficult to adhere to guidelines, and adverse effects may occur, such as not retaining content for a legally required duration, or conversely, retaining other content for too long a period of time. As a result, with the use of such databases, not only is there increased complexity, resulting in higher costs, but there is also an increased legal and compliance risk, as regulation requiring auditable content lifecycle records increases.

BRIEF DESCRIPTION OF THE DRAWINGS

The accompanying drawings are incorporated herein and form a part of the specification.

FIG. 8 shows aggregated table data from statistics run on source module data, along with calculations concerning data reduction potential.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for the assessing of data reduction potential of a source repository of a source module, by a central module, and the consequent conveying of data reduction potential information to the source module.

Figure 1:
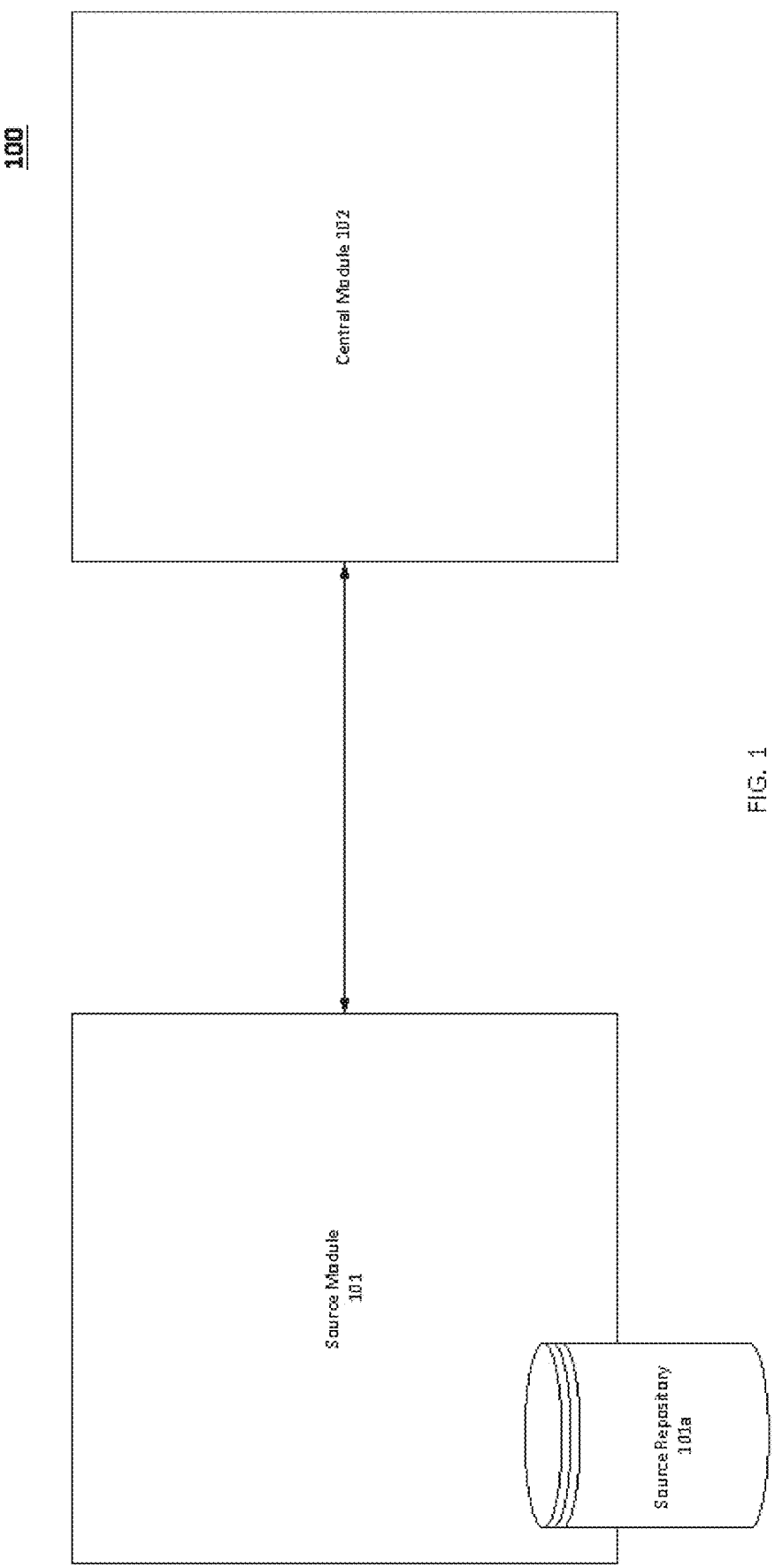
FIG. 1 is a block diagram of the interaction between a source module with a database and a central module, according to some embodiments.

FIG. 1 is a block diagram of a data-transfer environment 100 showing the interaction between source module 101, which includes source repository 101a, with central module 102. The user of the source module, using the disclosed embodiments, may be able to receive conveyed reports about data present within the source repository 101a, indicating the data reduction potential of the data present within the source repository 101a, through the central module 102, based on different data residence times. As defined herein, in some embodiments, a residence time defines for a data object the number of months (or other time period) which a user may keep the data object in a data repository (e.g., a database). According to an embodiment, the central module 102 and the source module 101 may comprise one or more separate computer systems such as the computer system 1000. According to an embodiment, the source module repository 101a may itself comprise one or more separate computer systems such as the computer system 1000, or the source module repository 101a may be present on an existing computer system 1000 of the source module 101.

To aid in describing the methods of FIG. 2 and FIG. 3 that follow, an example embodiment of the underlying structure will first be described. The underlying structure of a computer system 1000, shown in FIG. 10, can implement a database and the sending and receiving of data. Such a computer system, may, according to the embodiments describe above, include source module 101, source module repository 101a, and central module 102. Computer system 1000 may include one or more processors (also called central processing units, or CPUs), such as a processor 1004. Processor 1004 may be connected to a communication infrastructure or bus 1006.

Computer system 1000 may be virtualized, or it may also include user input/output devices 1003, such as monitors, keyboards, pointing devices, etc., which may communicate with communication infrastructure 1006 through user input/output interface(s) 1002.

One or more processors 1004 may be a graphics processing unit (GPU). In an embodiment, a GPU may be a processor that is a specialized electronic circuit designed to process table data received from the source module repository 101a when data is to be processed in a mass quantity, making it particularly effective in resource-intensive applications. The GPU may have a parallel structure that is efficient for parallel processing of large blocks of data, such as mathematically intensive data common to computer graphics applications, images, videos, word-processing documents, PDF files, and the like, any of which can include table data received from source module repository 101*a* as described above.

Computer system 1000 can also include a main or primary memory 1008, such as random access memory (RAM). Main memory 1008 can include one or more levels of cache (including secondary cache).

Computer system 1000 can also include one or more secondary storage devices or memory 1010. Secondary memory 1010 may include, for example, a hard disk drive 1012 and/or a removable storage device or drive 1014, which may interact with a Raid array 1016, which may combine multiple physical hard disk drive components (such as SSD or SATA-based disk drives) into one or more logical units, or a removable storage unit 1018. Removable storage unit 1018 may include a computer usable or readable storage device having stored thereon computer software (control logic) and/or data, including remotely accessed network drives. Removable storage unit 1018 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote entities 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the source module 101, the source repository 101*a*, and the central module 102 in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Computer system 100X) may be a client or server, accessing or hosting any applications and/or data through any delivery paradigm, including but not limited to remote or distributed cloud computing solutions such as cloud computing environment 901 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the source module repository 101*a*, as an example approach, for storing and accessing its constituent data objects, the computer system 1000 may use an in-memory database with persistence, which may store and access data objects from the primary memory 1008 of the computer system 1000 with a transaction log for persistence being stored in secondary memory 1010. The repository 101*a* as described in the following embodiments may use three types of data objects as reduction methods. A first such type of data object is an Aging Object, wherein the computer system 1000 may implement only part of the data present in the Aging Data object as an in-memory database, using less primary memory 1008 than as described above, to reduce the in-memory footprint, and may instead store a larger portion of the data as a disk-based database within the secondary memory 1010, where the data may thus be stored in a tiered manner (more frequently accessed data is stored in primary memory 1008 while less frequently accessed data is stored in secondary memory 1010).

A second type of data object used as a reduction method is an Archiving Object, wherein the computer system 1000 may store none of the data in the Archiving Object as a database in primary memory 10008 or secondary memory 1010, and the computer system 1000) in implementing the Archiving Object may instead write data within the Archiving Object to a separate file archive stored in the secondary memory (e.g., in a file on a hard drive in a Raid array 1016, on an EPROM chip 1020, or other type of secondary memory 1010, etc).

A third type of data object used as a reduction method is a Deletion object, wherein the designated data may be deleted by the computer system completely from primary memory 1008 and secondary memory 1010. Data sent from the source module repository 101*a* (if the source module repository is itself a computing system 1000) or from the source module 101 (if the source module repository is implemented as part of a computing system 1000 of the source module 101) may be sent through the communications interface 1024 to the central module in FIG. 1.

If the source module repository 101 a is implemented as a separate system 1000, it may send data through the communication or network interface 1024, wherein the source module 101 and central module 102 may comprise entities 1028 present on an internal or external network, which may be accessed through communications path 1026. Alternately, if the source module 101 is present along with source module repository 101a jointly in a computer system 1000, the computer system 1000 may implement the database using the communication infrastructure 1006 for communication between the source module repository 101a and the source module 101, but may send data to the central module 102 through the communications interface 1024, through communications path 1026, where central module 102 is a network entity 1028.

Figure 9:
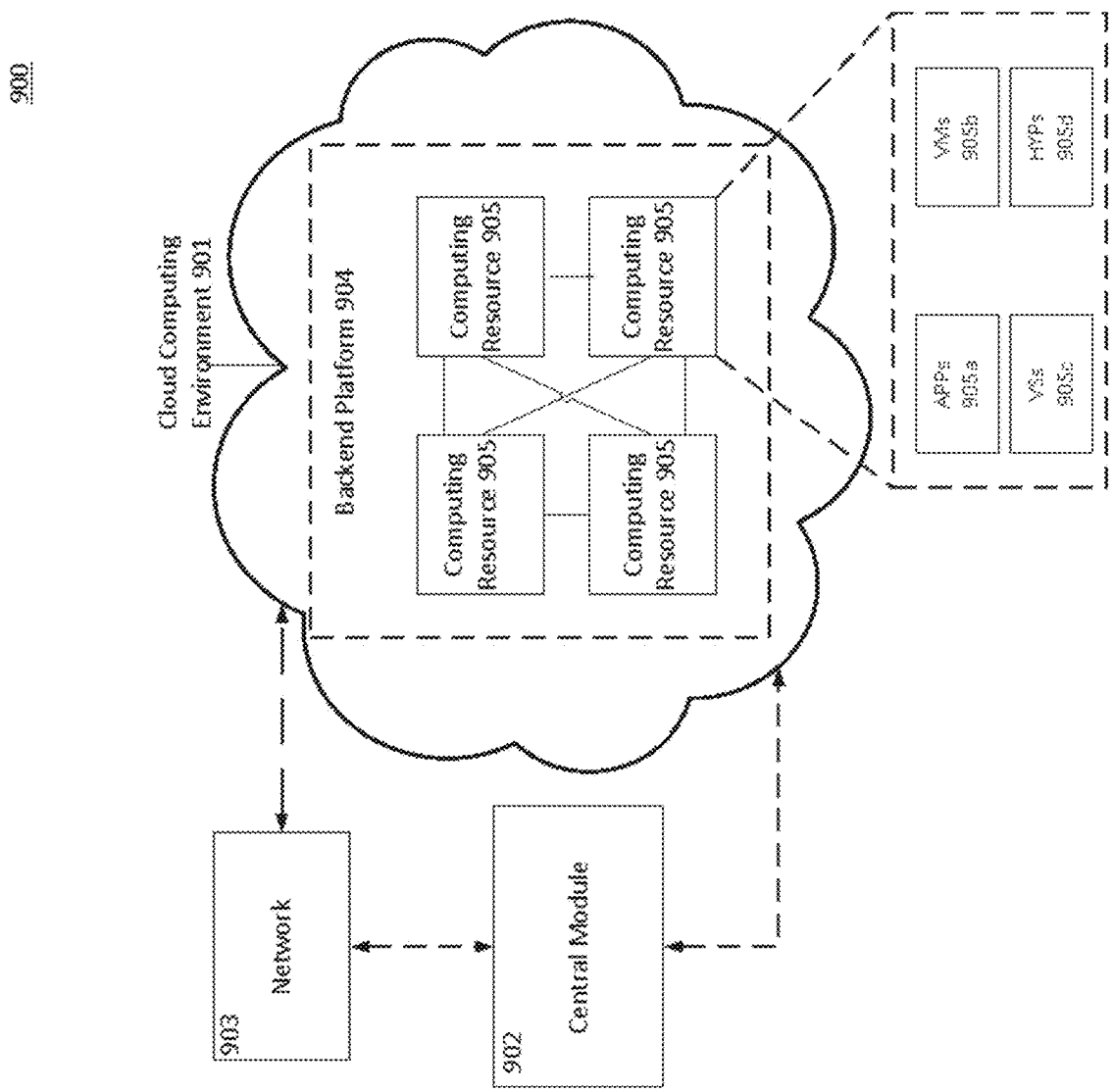
FIG. 9 is a block diagram of an example where a cloud computing environment may be accessed by a source module, according to some embodiments.
Figure 10:
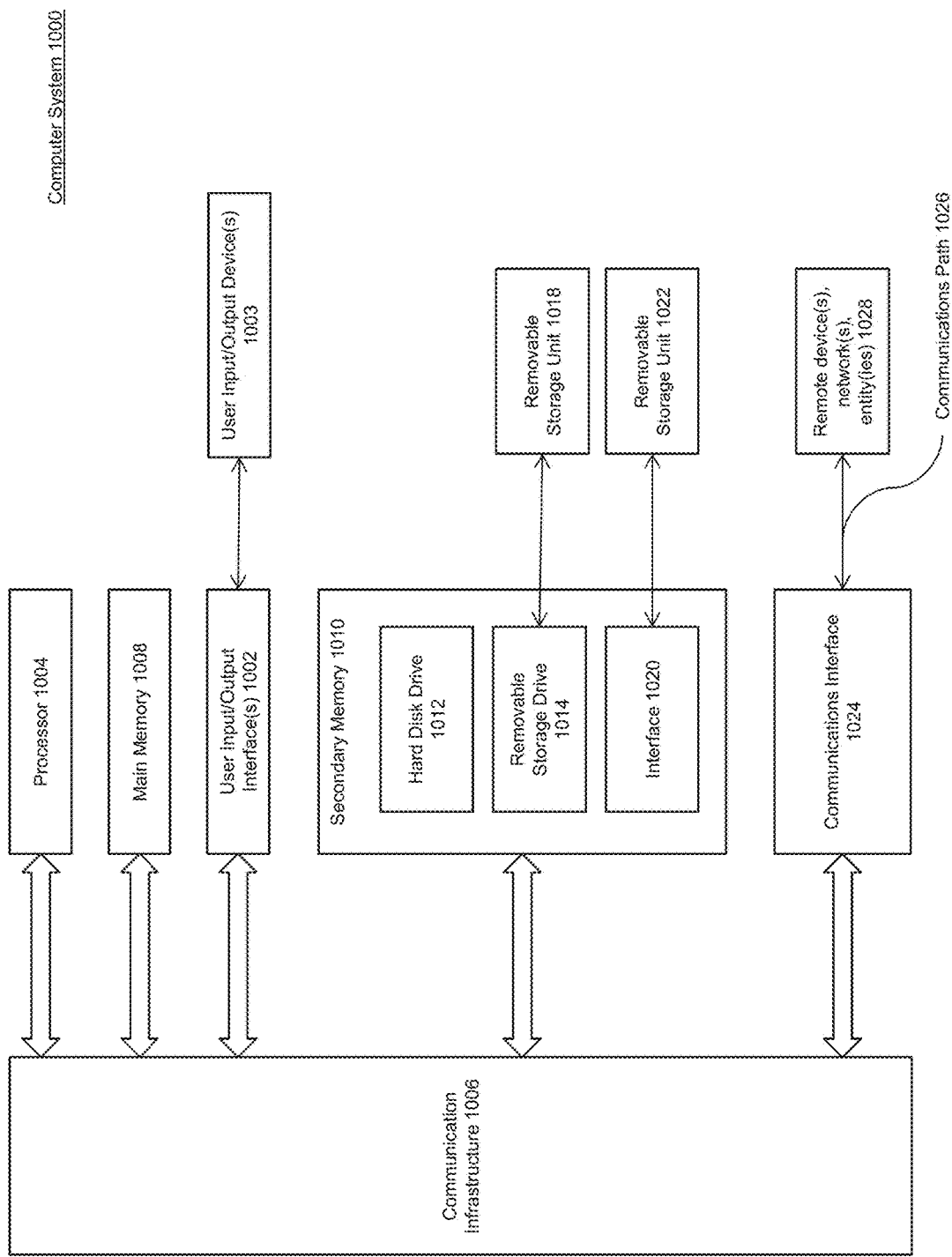
FIG. 10 is an example computer system useful for implementing various embodiments.

As shown in FIG. 9, cloud computing environment 901 may contain backend platform 904, in a block diagram of an example environment 900 in which systems and/or methods described herein may be implemented. The central module 102 of FIG. 1, described above, may also include a host such as cloud computing environment 901. The cloud computing environment 901 may be accessed by the central module computing system 902, of the same type of computing system 1000 as described above. In this case, the central module computing system 902 of FIG. 9 may access the cloud computing environment 901 by a communication or network interface 1024 as shown in FIG. 10, wherein a network gateway 903 may comprise a remote entity 1028 accessed by the communications path 1026 of the central module computing system (where the three entities 901, 902, and 903 shown in FIG. 9 would correspond to the central module 102 of FIG. 1). Alternately, the computing cloud environment 901 itself may correspond to a remote entity 1028 in FIG. 10, and may be accessed directly by the central module computing system 902 through a communications path 1026, for example through an application protocol interface (API), eliminating the need for a network gateway 903 (both options are shown in FIG. 9, wherein the flow path above the central module computing system 902 uses a network gateway 903, and the flow path below the central module computing system 902 connects directly to the cloud computing environment 901, both shown using dashed bi-directional lines).

The devices of the environments 900 and 100 may be connected through wired connections, wireless connections, or a combination of wired and wireless connections.

In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 102 of FIG. 1 may have a central module computing system 902 as shown in FIG. 9 comprising a computer system of the same type as the computer system 1000 as shown in FIG. 10. The source module 101 or source module repository 101a may access the central module 102 through the central module computing system 902, wherein the source module 101 or source module repository 101a may be external network entities 1028 from the perspective of the central module computing system 902 in an embodiment, and may send data back and forth in the form of data packets through the communications path 1026 of the communications interface 1024 of system 902, using e.g., TCP/UDP/FTP/HTML5 protocol. Alternately, the source module may access the central module 102 through a front-end application 905a (e.g. a web browser application, a web browser extension, proprietary OS application, standalone executable application, command line access shell program. FTP/UDP/TCP/HTML5 protocol, etc.) hosted as an application 905a on a computing resource 905 (explained infra) within the cloud computing environment 901 hosted by the central module 102, in an embodiment.

The backend platform 904 in FIG. 9 may include a server or a group of servers. In an embodiment, the backend platform 904 may host a cloud computing environment 901. It may be appreciated that the backend platform 904 may not be cloud-based, or may be partially cloud-based.

The cloud computing environment 901 includes an environment that delivers computing as a service ("CaaS" as described above), whereby shared resources, services, etc. may be provided to the central module computing system 902 and/or the backend platform 904. The cloud computing environment 901 may provide computation, software, data access, storage, and/or other services that do not require end-user knowledge of a physical location and configuration of a system and/or a device that delivers the services. For example, the central module computing system 902, as well as source module 101 may receive data stored within or hosted on a database within computing resources 905 within the backend platform 904, through an application protocol interface (API) or any of the various communication protocols previously listed. The cloud computing environment 901 may include computing resources 905.

Each computing resource 905 includes one or more personal computers, workstations, computers, server devices, or other types of computation and/or communication devices of the type such as computer system 1000 described above. The computing resource(s) 905 may host the backend platform 904. The cloud computing resources may include compute instances executing in the cloud computing resources 905. The cloud computing resources 905 may communicate with other cloud computing resources 905 via wired connections, wireless connections, or a combination of wired or wireless connections.

Computing resources 1005 may include a group of cloud resources, such as one or more applications ("APPs") 905a, one or more virtual machines ("VMs") 905b, virtualized storage ("VS") 905c, and one or more hypervisors ("HYPs") 905d.

An application 905a may include one or more software applications that may be provided to or accessed by a computer system 1000. In an embodiment, the central module 102 may only include a cloud computing environment 901 executing locally on a computer system 1000 of the central module computing system 902. The application 905a may include software associated with backend platform 904 and/or any other software configured to be provided across the cloud computing environment 901 (e.g. to source module 101). The application 905a may send/receive information from one or more other applications 905a, via one or more of the virtual machines 905b. Computing resources 905 may be able to access each other's applications 905a through virtual machines 905b, in this manner. In an alternate embodiment, a separate central module computing system 902 is not needed, and the central module 102 only comprises the cloud computing environment 901, hosted and executed by computing resources 905, and communicating with the source module 101 via app 905*a*, using any of the various communication protocols mentioned above.

Virtual machine 905*b* may include a software implementation of a machine (e.g., a computer) that executes programs like a physical machine. This may be of particular use in the alternate embodiment where there is no separate central module computing system 902 of the type of computer system 1000. In this embodiment, the central module computing system 902 may be a virtualized machine 905*b*, and may communicate with source module 101 using the various communication protocols listed above, via an application 905*a*. Virtual machine 905*b* may be either a system virtual machine or a process virtual machine. A system virtual machine may provide a complete system platform that supports execution of a complete operating system (OS). A process virtual machine may execute a single program and may support a single process. The virtual machine 905*b* may execute on behalf of a user (e.g., the administrator of the centra module 102) and/or on behalf of one or more other backend platforms 904, and may manage infrastructure of cloud computing environment 901, such as data management, synchronization, or long duration data transfers, and accessing the source module repository 101*a* of a source module 101.

Virtualized storage 905*c* may include one or more storage systems and/or one or more devices that use virtualization techniques within the storage systems or devices of computing resource 905. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 102 flexibility in how they manage storage for evaluation data from processing of data accessed from the source module repository 101*a* (as will be explained infra), as well as data reduction potential reports designated for different end users at the source module 101. File virtualization may eliminate dependencies between data accessed at a file level and location where files are physically stored. This manner of block and file virtualization may enable optimization of storage use, server consolidation, and/or performance of non-disruptive file migrations.

Hypervisor 905*d* may provide hardware virtualization techniques that allow multiple operations systems (e.g., "guest operating systems") to execute concurrently on a host computer, such as computing resource 905, which may include a computing system of the type of computing system 1000, and can in this manner host a virtualized hardware of a central module computing system 902. Hypervisor 905*d* may present a virtual operating platform to the guest operating systems, and may manage multiple instances of a variety of operating systems as these "guest operating systems," which may share virtualized hardware resource, such as RAM, which may for instance access the data in the form of a database of the source module repository (101*a* in FIG. 1). Alternately, secondary memory may be accessed using virtualized storage 905*c*, or on physical storage, such as the hard disk drive 1012, of a computing resource 905 or the type of computing system as computing system 1000. In embodiments heretofore described, using a combination of RAM and secondary memory to access the database, such that a portion of the database may be in-memory and a portion of the database stored in files, is also envisioned, wherein source module 101 may also include an environment 900 with a cloud computing environment 901, instead of only a computing system of the type of computing system 1000.

Figure 2:
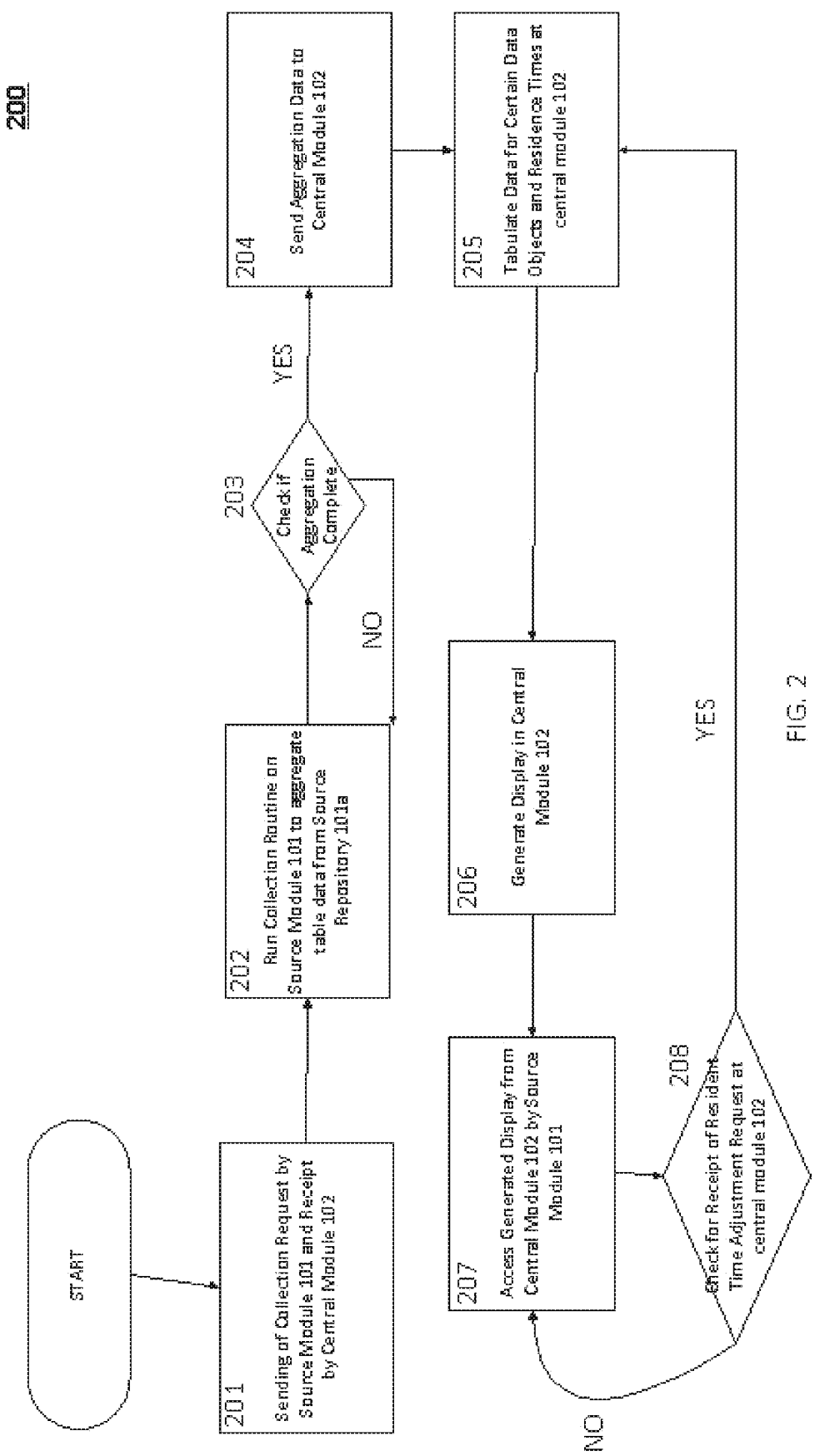
FIG. 2 is a flowchart illustrating a process for accessing a source module from a central module when triggered by a source module, collecting table data from the source module's database, tabulating statistics based on the table data, and outputting results back to the source module, according to some embodiments.
Figure 3:
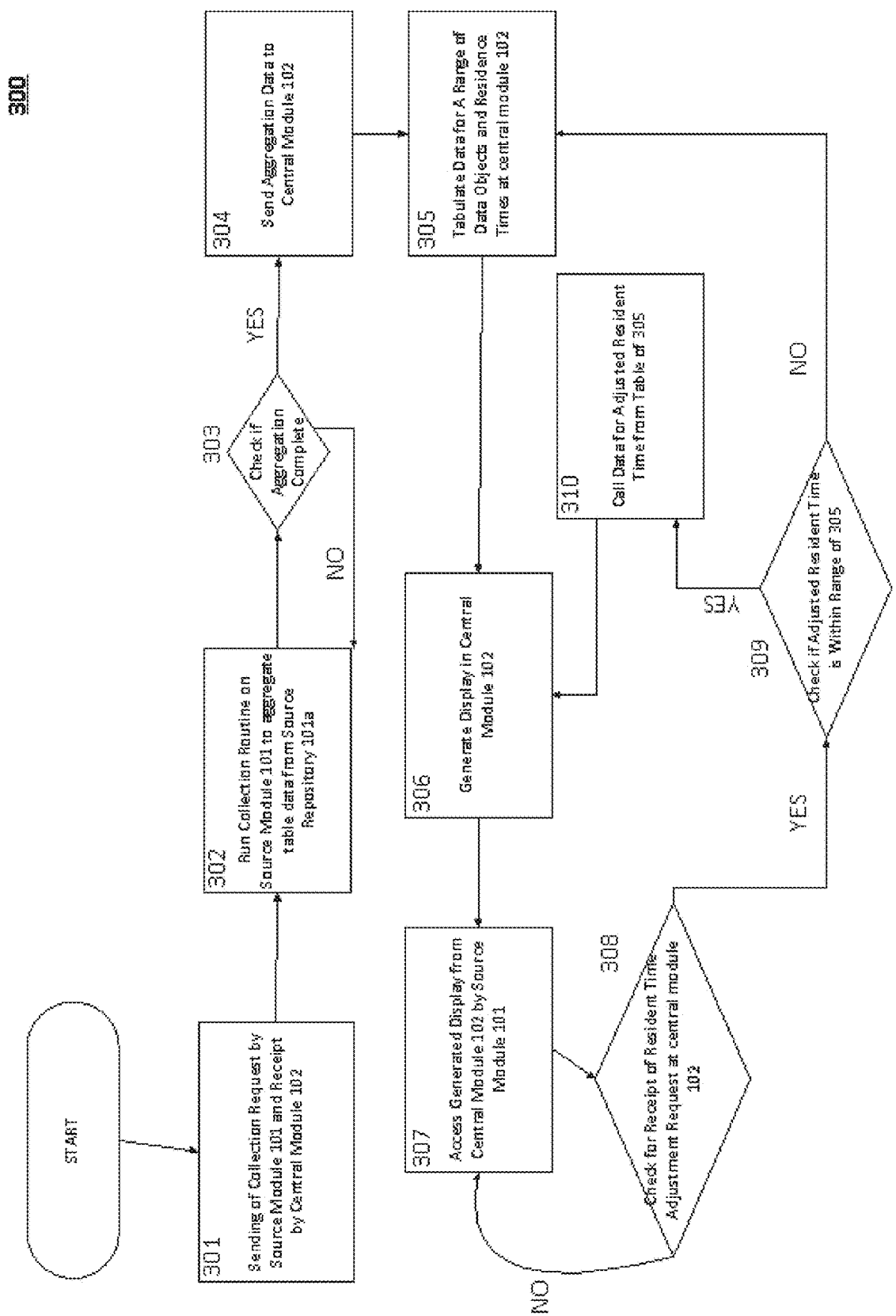
FIG. 3 is a flowchart illustrating a process for accessing a source module from a central module when triggered by a source model, collecting table data from the source module's database, tabulating statistics based on the table data, and outputting results back to the source module, according to some alternate embodiments for tabulating statistics.

FIGS. 2 and 3 are flowcharts for a combined processing method 200 and a dynamic recalculation method 300, respectively. Both methods may assess data stored in source module repository 101*a* of FIG. 1, by central module 102, and formulate metrics based on the assessments, and report the metrics back to the user of source module 101. Both method 200 and 300 can each be performed by processing logic that can include hardware (e.g., circuitry, dedicated logic, programmable logic, microcode, etc.), virtualized hardware, software (e.g., instructions executing on a processing device), virtualized software, or a combination thereof as described above. It is to be appreciated that not all steps may be needed to perform the disclosure provided herein. Further, some of the steps may be performed simultaneously, or in a different order than shown in FIGS. 2 and 3, as will be understood by a person of ordinary skill in the art.

Method 200 shall be described with reference to FIG. 1 and FIGS. 4-10, although method 200 is not limited to these embodiments. Although the steps of the method 200 are herein described such that the source module repository 101*a* of FIG. 1 is considered to be a part of the computing system 1000 of FIG. 10 comprising the source module 101, the method may also be carried out analogously in the case that the source module repository 101*a* of FIG. 1 itself includes a separate computing system 1000 of FIG. 10, wherein communication between the central module 102 and source module 101 described in relevant steps of the method 200 would require further network communication between the source module 101 and source module repository 101*a*, such as by using communications path 1026 of FIG. 10, as described above.

According to an embodiment, at the start of the process of method 200, at step 201, the central module 102 in FIG. 1 is listening for requests from source module 101 for data collection from source module repository 101*a*. This may be continuously at a predetermined regular interval (for example, 0-100 milliseconds), or at an irregular interval.

Once the central module 102 receives such a request at step 201, this request triggers the process to move forward, wherein the central module 102 then executes a collection subroutine in step 202, on source module 101, to aggregate table data from data objects in the source module repository 101*a* Such a collection subroutine may be present as executed instructions in various embodiments. For example, the collection subroutine may be executed from within primary or secondary memory of the central module computing system 902 in FIG. 9 by the processor of the system, wherein computing system 902 is part of central module 102 in FIG. 1. Alternatively, the collection subroutine may be executed as an application 905*a* of FIG. 9, executed on a computing resource 905 forming part of the backend platform 904 of a cloud computing environment 901 as previously described, wherein the cloud computing environment 901 is part of central module 102 in FIG. 1.

The execution of the collection subroutine at step 202 will herein be described in more detail. In an embodiment, data in the source module repository 101*a* may be present in the form of a single table or a plurality of tables for each data object, wherein the collection subroutine analyzes the tables in sequential or non-sequential order to determine and aggregate four parameters of raw data for each table of each data object: table name, number of records by summing up the number of records across the table, size in memory, and size on disk. Additionally, raw data may also include counters for summing up the records per month across each table for each of the tables, e.g., showing the history of number of records for a plurality of months in a year or multiple years.

After aggregating the parameters for each table in the source module repository 101*a* in step 202, the collection routine of the central module 102 checks whether the aggregation is complete in step 203, by checking for whether additional data is present in the source module repository 101*a* and there are still remaining tables to be processed for each data object. If there are remaining tables to processed ("NO" at step 203 in FIG. 2), then the collection subroutine returns to step 202 to run the collection subroutine on the next table of a data object in source module repository 101*a*.

If there are no remaining tables to be processed ("YES" at step 203 in FIG. 2), then the collection subroutine proceeds to send the aggregated data in step 204, which is received at central module 102. This data may be received by the central module 102 in step 204 using the communication pathway 1026 of a computing system 1000 of FIG. 10 formed by the source module 101 and/or source module repository 101*a*, wherein the central module 102 is a network entity 1028 relative to the computing system, wherein central module 102 may receive this data through communications path 1026 of communications interface 1024 of central module computing system 902 of FIG. 9 described above, using any of the various communication protocols described above. Alternatively, central module 102 may receive this data through a communications path 1026 of a computing system of the form of system 1000 of FIG. 10 comprising a computing resource 905 of the cloud environment 901, using any of the various communication protocols described, and/or in the form of a running application 905*a*.

At step 205, the central module 102 formulates metrics for tabulating data in an evaluation process, which will be described in more detail. This process, based on the raw parameters received for table size information (size in memory and size on disk) and number of records, and number of records per month, calculates for each combination of reduction method and table (of the three reduction methods described above) the reduction potential in memory and on disk. That is, as will be shown in the data reduction potential table FIG. 8, based on the size in memory, size on disk, number of records, and number of records per month for each table, each table is evaluated based on being stored as an Aging object, Archiving object, or Deletion object, under varying residence times (e.g. 0-9 months as shown in column 801*f*), to determine space that can be saved in memory and on disk, for reporting back to the source module.

In order to formulate the metrics, the size per month is first calculated. The size per month is calculated by first obtaining the average size of each record in the table (in memory by the formula [size in memory/number of records], and on disk by the formula [size in disk/number of records]) and then multiplying by the number of records per month, for each evaluation method. For example in FIG. 8, the reduction object 801*b* column displays the data object evaluated for reduction, "FI_DOCUMENT", which comprises two tables as indicated in column 801*c*, under the data aging ("DAAG") evaluation method as indicated in column 801*a*. Here, the "Reduction Size MEM" column 801*h* and the "Reduction size DISK" column 801*i* are calculated, respectively, according to the formulas. By way of example, for the first row in FIG. 8, if the raw parameters received indicate that the size in memory is 2000 kB, and the size on disk is 2200 kB, and that the total number of records is 1000, per the aforementioned formulas for average size of each record in memory and on disk, described above, the average size of each record in the table becomes 2 kB and 2.2 kB, respectively. Using this information, and given that the number of records for the month (column 801*e*) of April in the year (column 801*d*) 2019 is 100 (column 801*g*), the Reduction size MEM (column 801*h*) uses the formula [number of records for the month*average size in memory]= 100*2 kB=200 kB, which matches column 801*h*. Likewise, the Reduction size DISK (column 801*i*) uses the formula [number of records for the month*average size on disk]= 100*2.2=220 kB, which matches column 801*i*. In this manner, the computations are performed using the same formulas for columns 801*h* and 801*i* in each row.

Referring back to step 202 in the context of step 205, for larger-sized tables, it may be inefficient for the collection subroutine to gather the number of records per month in step 202 when the tables are over a threshold size for a data object. In such a situation, in an embodiment, the columns 801*h* and 801*i* in step 205 may be calculated using the number of records per month of a smaller data table present within the same data object. For example, for the data object "FI_DOCUMENT" shown in column 801*b* in FIG. 8, if there was a table_three to be gathered at step 202, which was large and over a threshold size, instead of scanning and summing for the number of records per month for each month in the collection subroutine, the number of records per month of a smaller table (e.g. Table_one may be used), and the formulas for computing 801*h* and 801*i* would, to determine number of records per month in the larger table, multiply the ratio of total number of records of the larger table to the total number of records of the smaller table by the number of records per month of the smaller table (e.g. for a month X, Number of Records per Month for Table_three=Total Number of Records for Table_three/Total Number of Records for Table_one*number of records for month X in table_one). In this manner, the tabulating process can therefore use these number of records per month of the smaller table in the calculations for a larger table in step 205.

As a further alternative embodiment in the collection step of step 202, machine learning logic maybe used with a support vector machine (SVM), random forest, or n-layer neural network with or without backpropagation, to classify a table over a certain size as dependent on the number of records per month in a smaller table (e.g. table_one) as a linear model, exponential model, logarithmic model, or n-polynomial model, based on associating factors such as type of data being analyzed, type of application data is being applied to, etc., to form a learning model to accurately predict how the number of records per month in a larger table corresponds to a smaller table. This machine learning logic may be implemented using the same computing resources executing the collecting subroutine, on the central module 102, as described above, in step 205, for calculations in the table shown in FIG. 8, based on raw data collected in step 202.

Further, in step 205, once columns 801*h* and 801*i* are accounted for, if there are any missing residence times (e.g. if one table does not have records in a certain month), then there may be a row added for this month with 0 records and also 0 reduction size MEM and 0 reduction size DISK, where columns 801*g* and 801*h* indicate potential reduction size in memory and in disk, respectively. This is shown for example in the first and second rows from the bottom of the table in FIG. 8, accounting for the months of August and September, in the year 2018, respectively, as indicated in columns 801*e* and 801*d*.

Finally, in step 205, after having created and tabulated records in this manner for a range of residence times (e.g. 0 to 9 months in FIG. 8) for each table (801*c*) in each data object (801*b*), the different sum values in columns 801*j* through 801*l* are then calculated. The sum of records (801*j*) is an accumulation of months, wherein the number of records from the previous month for a table in column (801*g*) is added to the number of records for the next month, and so on. For example, for the month of August (801*e*), 2018 (801*d*) for Table_one (801*c*), the Sum of Records (801*j*) is the number of records (801*g*) for this month (115) added to the number of records from the previous month (100, also from 801*g*, for July 2018), to give the resultant sum of records for August 2018, 215, which matches the result displayed in column 801*j*. The Sum of Reduction in MEM (801*k*) and Sum of Reduction on DISK (801*l*) are calculated in an analogous manner. The principle illustrated by doing so is that, from the earliest month onward, as the residence time becomes shorter (e.g. from 9 in July 2018 to 0 in April 2019), a greater sum of records (801*j*), and consequently a greater sum of reduction in memory (801*k*) and a greater sum of reduction on Disk (801*l*) can be freed, giving the administrator or user of the source module 101 more free primary/secondary memory, and enhancing module operation. The results of columns 801*k* and 801*l* for a specific residence time is calculated with regards to a smaller sized table At step 205, once all such metrics have been tabulated, as shown in FIG. 8 in the data reduction table, this data is sent in step 206 by the central module 102 for display to the user of the source module 101 in a user-friendly manner by generation of the GUI by the central module 102 in step 206, which is then accessed by the source module in step 207. In particular, in step 206, software is executed on the central module, e.g. in the form of an application in primary memory 1008 or secondary memory 1010, as shown in FIG. 10, of the central module computing system 902 of FIG. 9 which may be a computing system 1000, or e.g., as a web application 905*a* running on a computing resource 905 of cloud computing environment 901, to generate a display for the data contained in the table in FIG. 8 on a graphical user interface (GUI).

Figure 4:
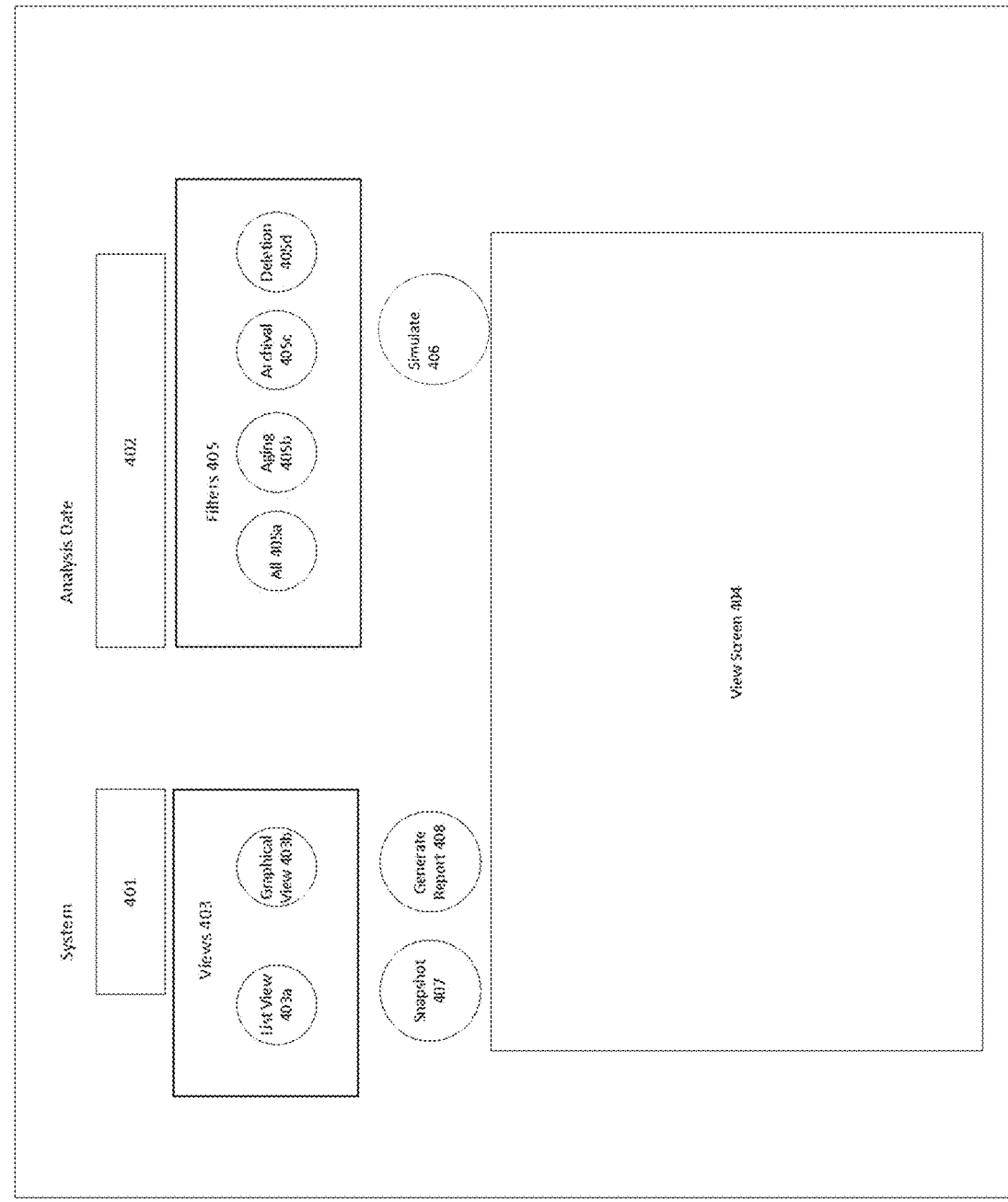
FIG. 4 is a graphic user interface (GUI) showing the display interface on a source module generated from a central module, and accessed by the source module, after statistics tabulation, with various views and filters, according to some embodiments.

In an embodiment, an example of this interface of step 206 is as shown in FIG. 4. A particular system or data object within the source module repository 101*a* may be able to be analyzed by choosing from a drop down or data-entry field 401. The analysis date, to access analysis made on past dates, may also be included in a drop down, wherein when a past date with an analysis made on that date is chosen, the data is loaded into view screen 404 as will be described infra. Alternatively, if a past analysis date is not chosen, the current date is displayed and a new analysis is performed.

Figure 5:
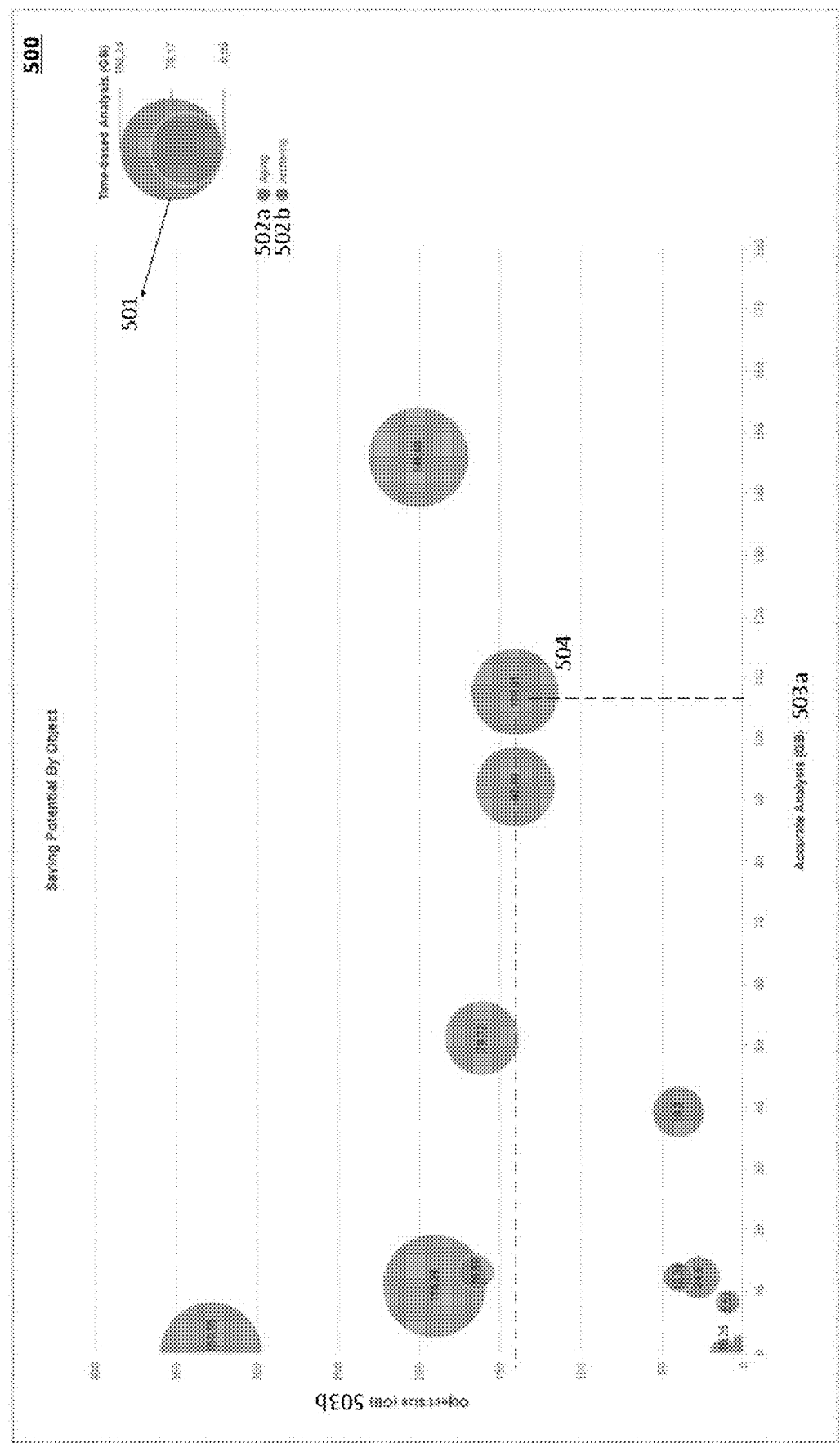
FIG. 5 shows the graphical view, which is displayed in the view screen of FIG. 4 when the graphical view option is chosen, according to some embodiments.
Figure 6:
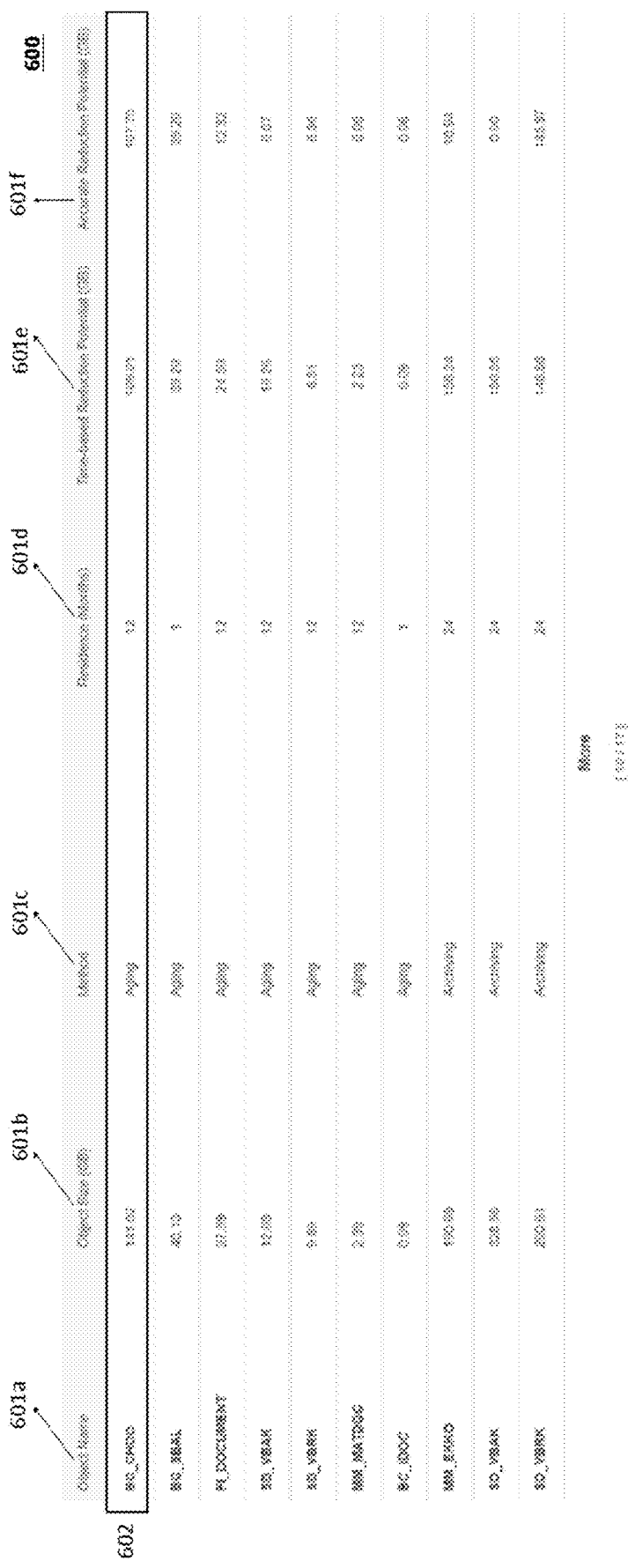
FIG. 6 shows the list view, which is displayed in the view screen of FIG. 4 when the list view option is chosen, according to some embodiments.
Figure 7:
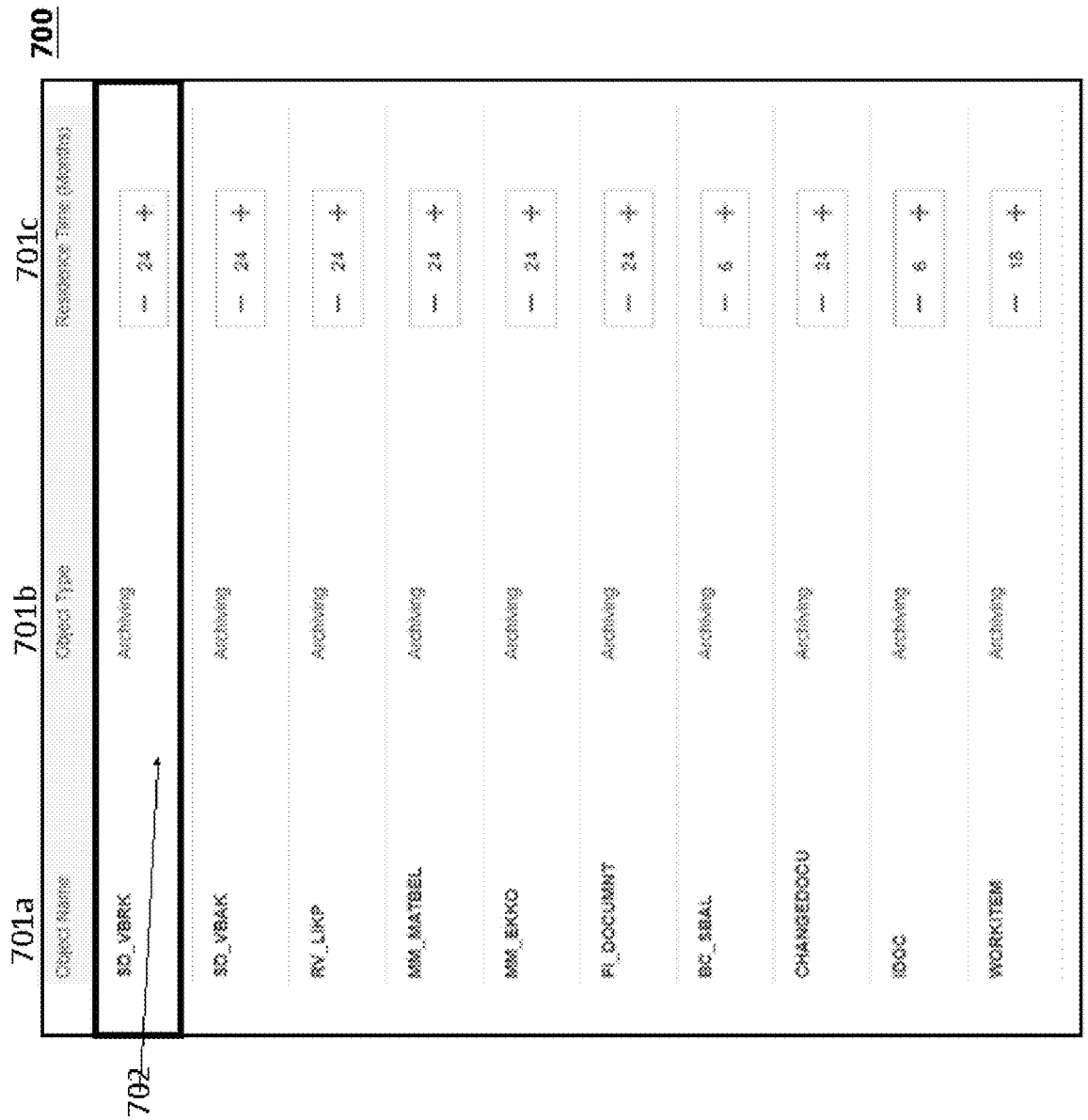
FIG. 7 shows the interactive simulation pane, which is displayed in the GUI of FIG. 4 when the simulate option is chosen, according to some embodiments.

In step 207, the central module 102, based on user input (e.g. clicking on buttons graphical view 403*b* or list view 403*a*), may be configured to generate a graphical representation of the data, as shown in FIG. 5, or a list representation of the data, as shown in FIG. 6, on the source module 101, which may include a computing system 1000 of FIG. 10 as described above. In the example graphical representation 500 shown in FIG. 5, a single visual entity such as the bubbles 504 may form a novel structure indicating 3 dimensions of data in a visually friendly format to the user In particular, the horizontal-axis position corresponds to the accurate analysis (GB), the vertical-axis position corresponds to the object size (GB), while the size of the bubble 504 with respect to the scale 501 indicates the time-based analysis (GB), wherein the type of object, such as Aging Objects 502*a*, or Archiving Objects 502*b*, may be indicated by the shade or hue of the bubble. For example, in FIG. 5, with respect to FIG. 8, for the time-based analysis for a particular residence time (e.g. 9 months), the results of all tables (including the two shown in FIG. 8) for the data object "F1_Document" may be added to form a cumulative time-based analysis savings potential (sum of results for a particular residence time for all tables in column 801*k* or 801*l*), which is displayed in FIG. 5, where the magnitude of the cumulative time-based analysis savings potential is shown to the user with respect to the scale 501. The object size 503*b* indicates the current object size (e.g. the current size of "F1_Document") which is the sum of the size of all data tables within the data object (where the maximum of the sum of the tables size on disk, and the sum of the tables size in memory is taken as the sum of the size of the tables), while the accurate reduction potential follows the same methodology as the time-based savings potential but on different raw data. The accurate reduction potential data takes additional business-based attributes into account, such as e.g., where a data object may not be archivable because of its status, where for financial instrument documents, for example, it might need to be open, or for data objects concerning deliveries related documents, the object might be missing some goods, etc. In this manner, any viewer with one quick glance can tell, as a whole, with a particular residence time, how much potential memory may be able to be freed by the bubbles displayed in FIG. 5, with respect to their placement relative to the horizontal axis 503*a* indicating the dimension of accurate reduction potential, the vertical axis 503*b* indicating the dimension of objective size, and the size of the bubble itself indicating the dimension of time-based analysis savings potential with respect to the scale 501.

In step 207, the same information as displayed in the graphical representation in FIG. 5, for numerical representation purposes, may also be displayed as shown in FIG. 6 as the view screen 404, generated by the central module 102 and accessed by the source module 101. In FIG. 6, for the example row 602 shown, columns 601*a* through 601*f* provide the object name, object size (GB), method of reduction, residence time in months, time-based reduction potential (GB), and accurate reduction potential (GB), respectively. This aids the user if they are looking for an accurate numerical listing of any of these parameters. The raw data of each data object from source module repository 101*a* is analyzed using each of the three reduction methods, so Aging Objects. Archiving Objects, and Deletion Objects for the tables from each data object may be displayed in the above-mentioned manner in FIG. 5 or 6.

In the display GUI 400 generated and executed on central module 102 and accessed by and shown to the user of the source module 101 in step 207, several actions may be taken aside from changing the type of view 403. First, the user may selectively view objects in either the graphical representation (FIG. 5), or the list representation (FIG. 6), by selecting an appropriate filter button such as all objects (405*a*), aging objects (405*b*), archival objects (405*c*), or deletion objects (405*d*). When any of these buttons are clicked, the central module 102 receives instructions through the generated display to only display the desired objects on the view screen 404. The resultant display shown in view screen 404 aids the viewer in analyzing the results only for a particular reduction method. Additionally, the central module 102 may also receive instructions if buttons 407 or 408 are clicked, to generate a snapshot or data savings report, respectively. In either case, the central module 102 may internally generate a GUI snapshot, wherein the GUI may be being displayed from the central module 102, on the source module 101 through an application protocol interface (API) e.g., on a web browser, web browser extension or other application, etc. In the same manner, a data report may be generated as a deliverable document based on the current data object(s) being analyzed and residence time settings, as being displayed in the view screen 404. For example, the report may generate aggregate list and graphical views. Alternatively, the report may generate list and graphical views for additional residence times for selectable data objects, and may provide side-by-side views showing data savings for different residence times. The snapshot may be produced in any commonly known picture format, and the report may be produced in any commonly known document format. Both the snapshot and the report when requested may be sent by the central module 102 to the source module 101 using any of the common communication or data transfer methods mentioned above.

In step 207, the user may also manipulate the data being analyzed dynamically by using the simulate button 406. When the simulate button 406 is clicked, the central module 102 receives instructions to display the interactive simulation pane shown in FIG. 7, and the process proceeds to step 208, as will be explained below. In this pane the residence time for which data is shown in the view screen 404 in FIG. 4 (by the graphical representation view in FIG. 5 or the numerical representation view in FIG. 6) may be manipulated by the +/− dialogue boxes shown in column 701c.

In the aforementioned description of the GUI, the shapes of the buttons are only displayed as representative, and are not confined to that shown in the FIG. 4. Additionally for other elements such as the dialogue boxes in 701c, any other interchangeable element, such as visual sliders, scrolling bars, drop-down boxes and the like, may be used.

In the simulation pane, while the display step of 207 is occurring, the central module 102 is checking for requests for time adjustment request in step 208 of the process. This can be checked at a periodic time period (e.g. a period of milliseconds) or at an irregular time period. Normally, when such a check is performed, if no such request is detected ("NO" at 208 in FIG. 8), then the process reverts back to the display step in 207. However, when the + or − buttons of a dialogue box in 701c are clicked, and/or a custom time is keyed in, the central module 102, receives such a request ("YES" in FIG. 8), and accordingly accesses the relevant portion needed of FIG. 8 from the tabulations in step 205, and readjusts the GUI, sending it back for display in step 206 to the source module 101, where the display is once again loaded in step 207. For example, if the residence time for "F1_Document" was changed from 9 months to 7 months using the interactive pane 700, then central module 102 would simulate the time based reduction potential and the accurate analysis (GB) in step 205 by adding the data from the rows of each table in object "F1_Document" which have the residence time of 7 months (e.g. 200 and 500 in column 801k and 220 and 550 in column 801l), and would reinterpret this data to give new figures in step 206 for time based analysis (GB) and accurate analysis (GB). Because the entire table for a range of residence times from 0-9 months had already been previously calculated using the computing resources of the central module (102) as explained previously and shown in FIG. 8, the re-adjustment process using this table provides almost instantaneous access to the viewer of the source module to see the impact of different residence times and reduction methods for data objects with regards to potential data savings. This data savings may translate to enhanced legal compliance, cost efficiency, and ease-of-doing-business features, and the balance in keeping data while not occupying a disproportionate amount of space can be assessed.

Alternatively, the dynamic recalculation mode of FIG. 3 will be described. This mode can be used when data objects are very large, and if the computing resources of the central module, such as primary memory/secondary memory of central module computing system 902 or computing resources 905 need to be conserved, or are slow to process the table in FIG. 8.

The operations of FIG. 3 are analogous to that of FIG. 2. The difference between the two methods is that while the central module 102 in method 200 may analyze a full set of residence times to generate the table shown in FIG. 8 in step 205, in FIG. 3, the central module 102 may only analyze residence times for, e.g., the earliest month (July 2018 for Table_one corresponding to a residence time of 9 months and September 2018 for Table_two corresponding to 9 months in FIG. 8), corresponding to only one calculation needing to be done for each of columns 801j through 801l for each table, for step 305. In this manner, through fast initial table processing, the GUI may be able to be more speedily displayed by the central module 102 onto the source module 101 in step 307. Then when the interactive pane 700 is used by the user in step 308, analogous to step 208 described above, to specify a different residence time (shorter than 9 months in the above example) at step 308 ("YES" at 308), then the central module 102 may check at step 309 if the adjusted resident time is within the range of pre-calculated times (in our above example anything shorter than 9 months is not calculated so it would be "NO" at step 309), and then the data may be recalculated at step 305 using the above-mentioned procedure up to the specified residence time (e.g., 7 months). Subsequently, this information is available in the table contained in the central module, so in the future, if a user were to again request an adjustment of residence time for the same object at step 308, but this time up to e.g. 8 months in our above example, because we have already calculated the residence time up to 7 months, at step 309 the process would follow the "YES" branch, and subsequently, under step 310, would call the data from the pre-calculations done in the table in the central module 102, analogous to the "YES" branch of 208 in FIG. 2, and would in a similar manner readjust the figures and send the GUI for display in step 306. In this manner, FIG. 3 presents a flexible algorithm which may be used to pre-calculate a certain number of residence times but not the full range, and then may only calculate data savings for additional residence times as needed, as per user request through the interactive pane 700.

Based on the teachings contained in this disclosure, it will be apparent to persons skilled in the relevant art(s) how to make and use embodiments of this disclosure using data processing devices, computer systems and/or computer architectures other than that shown in FIGS. 1, 9, and 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   executing, by at least one processor, a collection routine on a source data repository, the source data repository comprising data objects each having a plurality of tables, to gather raw data parameters on each table of the source data repository;
   receiving results of the collection routine in a form of the raw data parameters for each table of each data object of the source data repository, by the at least one processor;
   processing, by the at least one processor, the raw data parameters to generate a data table, including using the raw data parameters to calculate data savings potential statistics for each table of the source data repository;
   executing commands to generate a graphic user interface (GUI), by the at least one processor, visually representing data savings potential statistics generated by said processing; and
   displaying said GUI, by the at least one processor;
   wherein at least one of the executing, receiving, and displaying are performed by one or more computers.

2. The method of claim 1, the visually representing further comprising:
   combining the calculated data savings potential statistics processed for each table of the source data repository for all such tables in each data object.

3. The method of claim 2, further comprising:
   displaying the combined data savings potential statistics processed for each data object of the source data repository.

4. The method of claim 3, further comprising:
   displaying combined results of data savings potential statistics processed for each data object of the source data repository as a single visual entity, representing a plurality of dimensions of said combined results.

5. The method of claim 1, the displaying further comprising:
   displaying said GUI within a web application generated on a computing resource, the computing resource forming part of a backend platform, the backend platform hosting a cloud computing environment; and
   implementing the cloud computing environment by the at least one processor.

6. The method of claim 1, further comprising:
   receiving a number of data records per month for each table, for each data object of the source data repository, as part of the receiving of the results by the at least one processor;
   wherein the calculating by the at least one processor of the data savings potential statistics includes applying at least one of three reduction methods including archiving, aging, and deleting to each data object of the repository, wherein said application utilizes the number of data records per month to calculate the data savings potential statistics by the at least one processor.

7. A system, comprising:
   a memory; and
   at least one processor coupled to the memory and configured to:
   execute a collection routine on a source data repository, the source data repository comprising data objects each having a plurality of tables, to gather raw data parameters on each table of the source data repository;
   receive results of the collection routine in a form of the raw data parameters for each table of each data object of the source data repository;
   process the raw data parameters to generate a data table, including using the raw data parameters to calculate data savings potential statistics for each table of the source data repository;
   execute commands to generate a graphic user interface (GUI) visually representing data savings potential statistics generated by said processing; and
   display said GUI.

8. The system of claim 7, wherein the at least one processor is further configured to:
   display said GUI in an application configured to be accessed by a source module system comprising a second memory, and at least one second processor coupled to the second memory, wherein the at least one processor is configured to implement the source data repository as stored and accessed by the at least one second processor of the source module system from the second memory of the source module system.

9. The system of claim 8, wherein the at least one processor is further configured to:
combine the calculated data savings potential statistics processed for each table of the repository, for all such tables in each data object.

10. The system of claim 9, wherein the at least one processor is further configured to:
visually display the combined data savings potential statistics processed for each data object of the source data repository.

11. The system of claim 10, wherein the at least one processor is further configured to:
display the combined data savings potential statistics processed for each data object of the source code repository as a single visual entity, representing a plurality of dimensions of said combined results.

12. The system of claim 7, further comprising a computing resource, a backend platform, and a cloud computing environment, wherein the at least one processor is further configured to:
display said GUI within a web application generated on said computing resource, the computing resource forming part of the backend platform, the backend platform hosting the cloud computing environment, wherein the computing resource forms part of the cloud computing environment; and
implement the cloud computing environment.

13. A non-transitory computer-readable device having instructions stored thereon that, when executed by at least one computing device, cause the at least one computing device to perform operations comprising:
executing a collection routine on a source data repository, the source data repository comprising data objects each having a plurality of tables, to gather raw data parameters on each table of the source data repository,
receiving the results of the collection routine in a form of the raw data parameters for each table of each data object of the source data repository;
processing the raw data parameters to generate a data table, including using the raw data parameters to calculate data savings potential statistics for each table of the source data repository;
generating a graphic user interface (GUI) visually representing data savings potential statistics generated by said processing; and
displaying said GUI.

14. The non-transitory computer-readable device of claim 13, the generating further comprising:
combining, the calculated data savings potential statistics processed for each table of the source data repository, for all such tables in each data object.

15. The non-transitory computer-readable device of claim 14, the operations further comprising:
displaying the combined data savings potential statistics processed for each data object of the source data repository.

16. The non-transitory computer-readable device of claim 15, the operations further comprising:
displaying combined results of data savings potential statistics processed for each data object of the source data repository as a single visual entity, representing a plurality of dimensions of said combined results.

17. The non-transitory computer-readable device of claim 13, the displaying further comprising:
displaying said GUI within a web application generated on a computing resource, the computing resource forming part of a backend platform, the backend platform hosting a cloud computing environment; and
implementing the cloud computing environment.

18. The non-transitory computer-readable device of claim 13, the operations further comprising:
receiving a number of data records per month for each table, for each data object of the source data repository, as part of the receiving of the results;
wherein the calculating of the data savings potential statistics includes applying at least one of three reduction methods including archiving, aging, and deleting to each data object of the source data repository, wherein said application utilizes the number of data records per month to calculate the data savings potential statistics.

* * * * *